United States Patent [19]
Kobayashi et al.

[11] Patent Number: 6,003,801
[45] Date of Patent: Dec. 21, 1999

[54] DOUBLE-BEARING TYPE FISHING REEL WITH LOW-RESISTANCE LINE FEED

[75] Inventors: Mikiharu Kobayashi, Tokyo; Shinichi Asano, Chiba, both of Japan

[73] Assignee: Daiwa Seiko, Inc., Tokyo, Japan

[21] Appl. No.: 08/864,540

[22] Filed: May 28, 1997

[30] Foreign Application Priority Data

May 31, 1996  [JP]  Japan ............................... 8-005870 U

[51] Int. Cl.$^6$ ................................................ A01K 89/015
[52] U.S. Cl. ............................................. 242/310; 242/319
[58] Field of Search ........................................ 242/310, 319, 242/262; 254/333

[56] References Cited

U.S. PATENT DOCUMENTS

| | | | |
|---|---|---|---|
| 1,461,586 | 7/1923 | Schmid | 242/310 X |
| 3,765,618 | 10/1973 | Johnson et al. | 242/319 X |
| 5,108,042 | 4/1992 | Puryear et al. | 242/310 X |
| 5,503,345 | 4/1996 | Kaneko | 242/310 X |
| 5,601,246 | 2/1997 | Takahashi | 242/310 X |

FOREIGN PATENT DOCUMENTS 3-16087  3/1991  Japan .
4-17004  4/1992  Japan .

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

A double-bearing type fishing reel which is improved so that, when the fishing line is let out of the reel, it will not be brought into contact with the protrusions which have uneven surfaces confronting the spool. A cover member whose front and rear end portions are curved is provided radially outwardly of a spool (13) between right and left side frames inside side boards except an upper opening extending from a finger placing member to the fishing line guide (8). The front end portion of the cover member is located near a recess of the fishing-line guide. The surface of the cover member is preferably smooth and is made of fluoro-material.

17 Claims, 3 Drawing Sheets

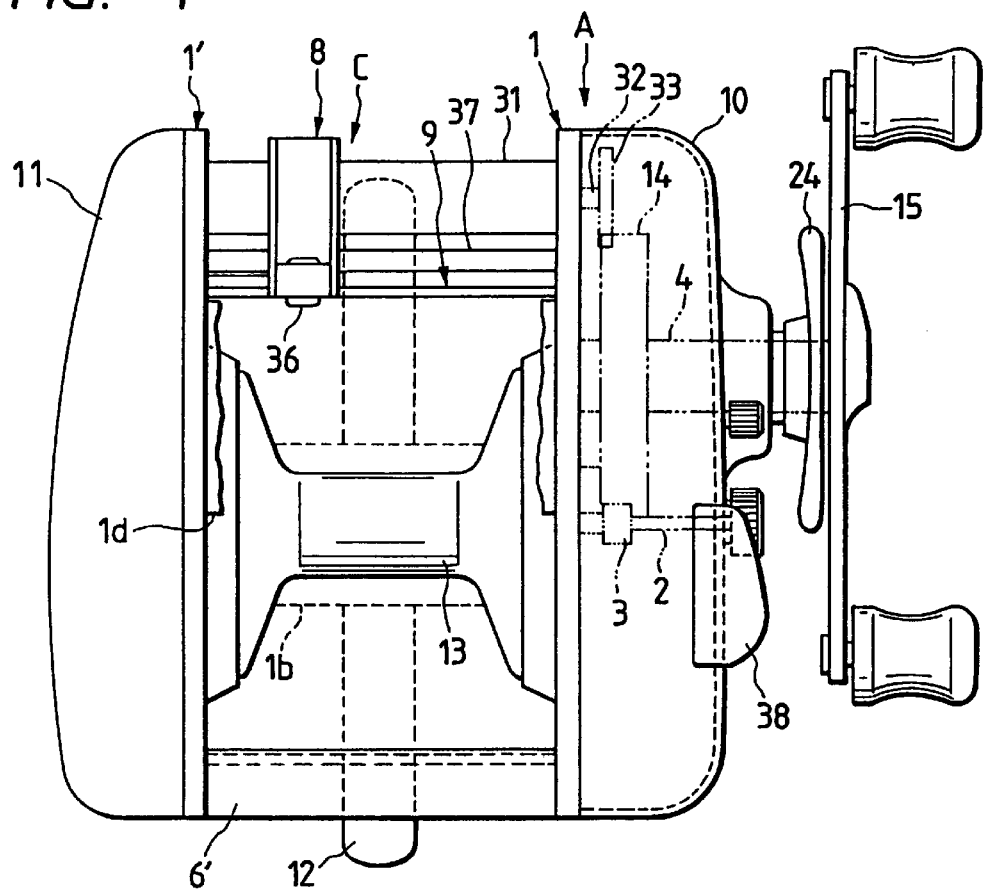
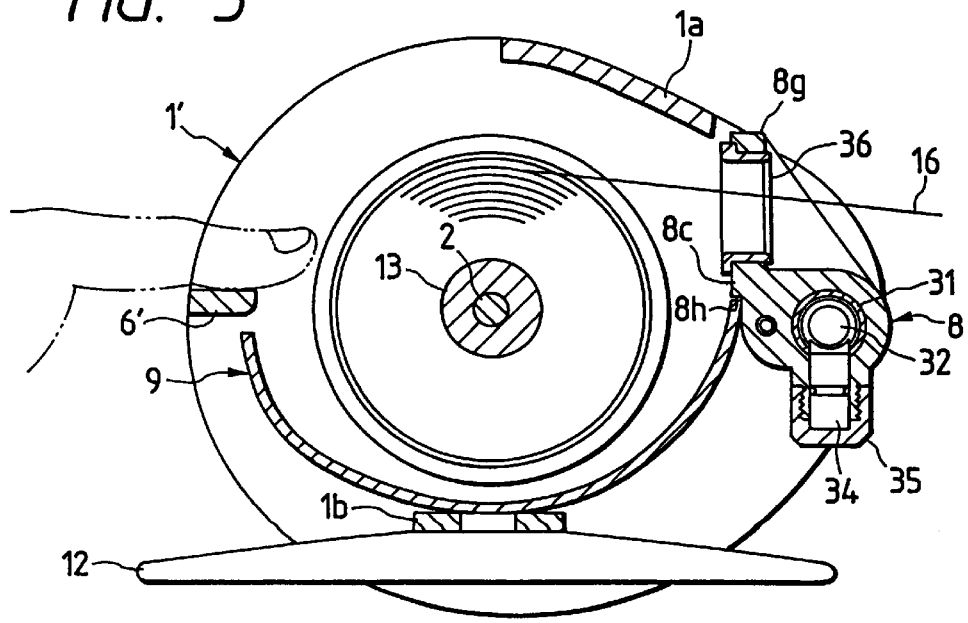

DOUBLE-BEARING TYPE FISHING REEL WITH LOW-RESISTANCE LINE FEED

BACKGROUND OF THE INVENTION

This invention relates to a double-bearing type fishing reel which is in such a manner improved that the fishing line does not touch protrusions which are provided outside the spool.

Heretofore, as disclosed by Japanese Utility Patent Application Publication No. 17004/1992 and Japanese Patent Application Publication No. 16087/1991, protrusions are provided near the spool of a double-bearing type fishing reel. A fishing line is wound on the spool, which is rotatably supported between the side boards of a reel body. These protrusions include the operating member of a clutch for switching the operating state of the spool over to a line take-up state or to a line let-out state, a finger-placing member, the fishing-line guide of a level wind device adapted to wind the fishing line parallel on the spool, and a fishing rod mounting section which is mounted on the fishing rod.

The surfaces of those protrusions which confront the spool are uneven.

Hence, when the fishing line is let out of the reel, it may become twined around the protrusions, or it may be brought in contact with the latter, thus being damaged. Furthermore, if the fishing line is brought into contact with the protrusions when let out, it is resisted thereby, which adversely affects the fishing-line throwing distance, or decreases the service life of the fishing line. That is, the fishing line is not smoothly let out.

SUMMARY OF THE INVENTION

In view of the foregoing, an object of the invention is to provide a double-bearing type fishing reel which is improved so that, when the fishing line is let out of the reel, it will not be brought into contact with the protrusions which have uneven surfaces confronting with the spool.

The foregoing object of the invention has been achieved by the provision of a double-bearing type fishing reel in which a finger-placing member is provided behind a spool which is rotatably supported between right and left side boards of a reel body, and a fishing-line guide of a level wind device adapted to wind a fishing line evenly on the spool is movably provided; in which, according to the invention, a cover member whose surface is smooth is arranged radially outwardly of the spool and between the right and left side frames except for at an upper opening extending from the finger-placing member to the fishing-line guide.

BRIEF DESCRIPTION OF THE DRAWINGS

FIG. 4 is a plan view of another example of the double-bearing type fishing reel, which constitutes a second embodiment of the invention.

FIG. 5 is a side view, with parts cut away, showing the essential components inside the side frame in the fishing reel shown in FIG. 4.

DETAILED DESCRIPTION OF THE PREFERRED EMBODIMENTS

Preferred embodiments of the invention will be described with reference to the accompanying drawings.

Figure 1:
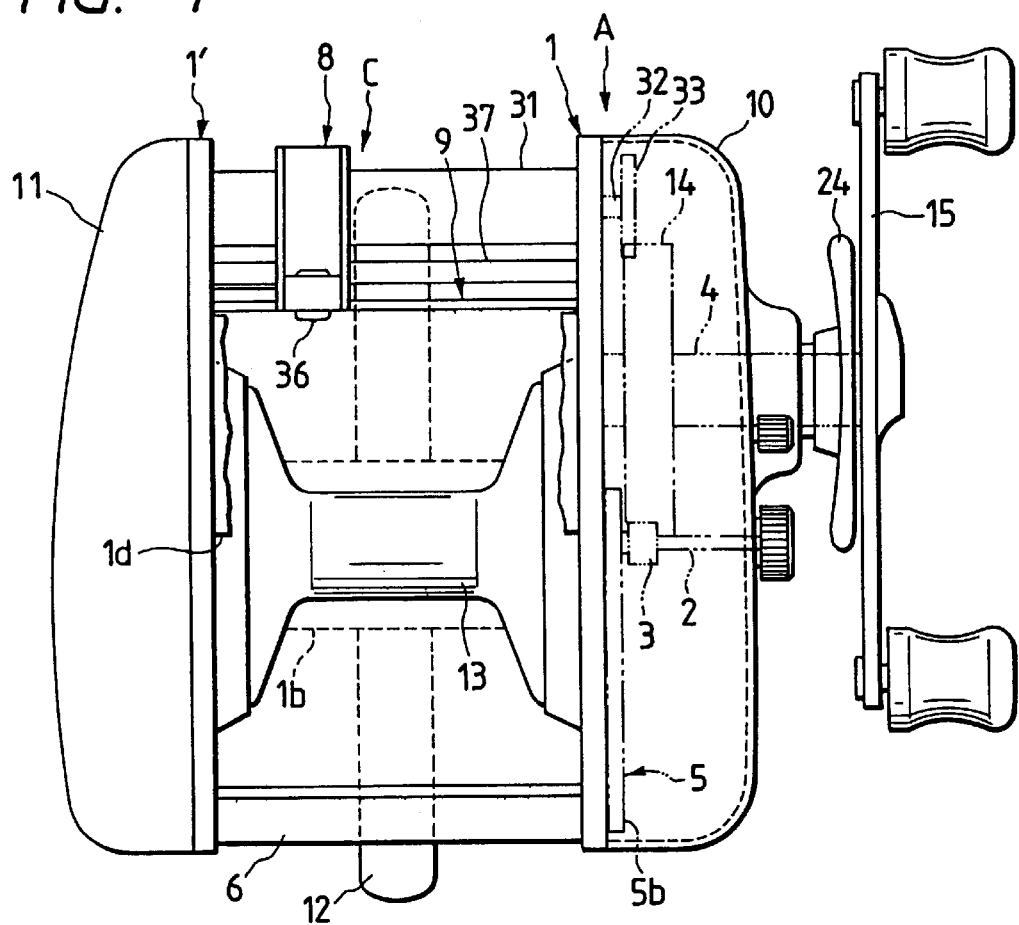
FIG. 1 is a plan view of an example of a double-bearing type fishing reel, which constitutes a first embodiment of the invention.
Figure 2:
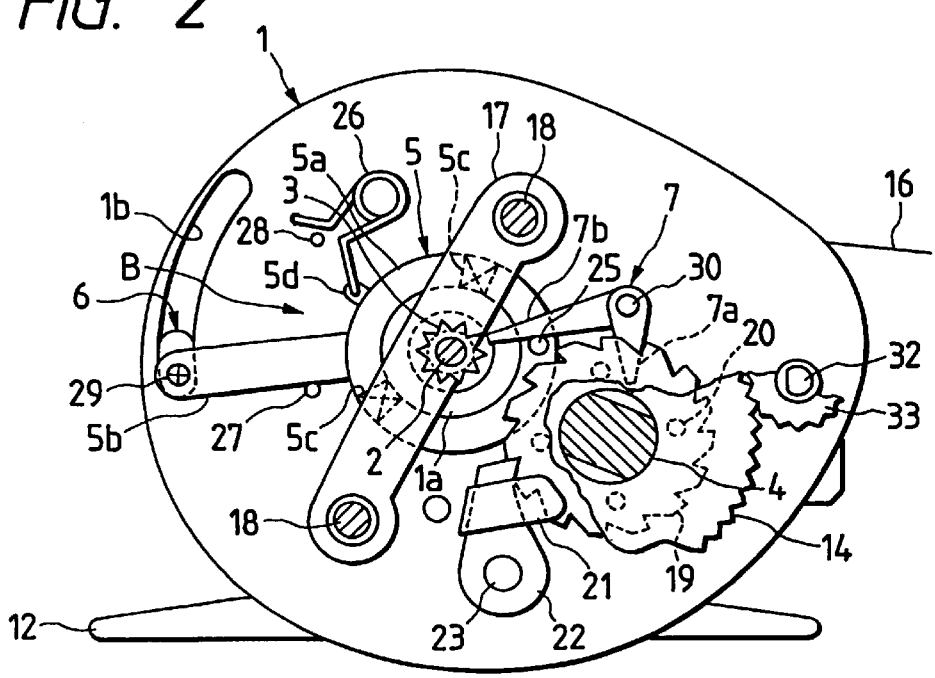
FIG. 2 is a side view, with parts cut away, showing the inside of a side board on the handle side.
Figure 3:
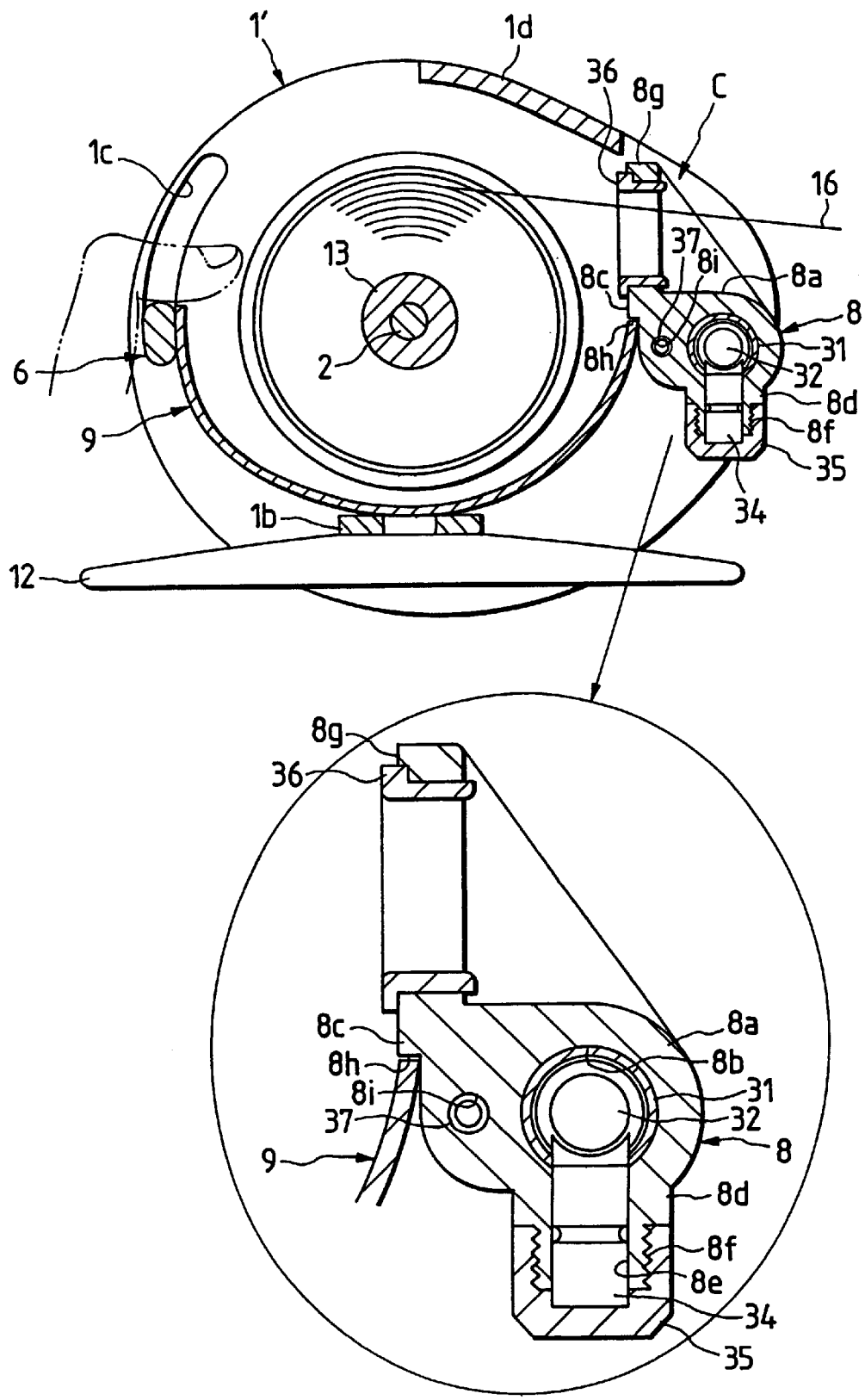
FIG. 3 is a side view, with essential parts cut away, showing the inside of a side frame of the fishing reel, and an enlarged sectional side view of a level wind device.

FIGS. 1 through 3 show a first embodiment of the invention. More specifically, FIG. 1 is a plan view of an example of a double-bearing type fishing reel, which constitutes a first embodiment of the invention, FIG. 2 is a side view, with parts cut away, showing the inside of a side board on the handle side, and FIG. 3 is a side view, with parts cut away, showing essential components inside a side frame.

A reel body A comprises right and left side frames 1 and 1', and side boards 10 and 11 provided outside those side frames.

The right and left side frames 1 and 1' of the reel body A are held parallel with a reel leg 12 and a finger-placing plate 1d located above the middle portion of the reel.

A spool 13 is fixedly mounted on a spool shaft 2 between the right and left side frames 1 and 1'. The spool shaft 2 is rotatably supported by two bearings (not shown). More specifically, the spool shaft 2 is turned with the aid of a clutch mechanism B, a pinion 3 mounted on the spool shaft 2, a drive gear 14 which is frictionally coupled to a handle shaft 4, and a handle 15 secured to the handle shaft 4.

A fishing line 16 is wound on the spool 13, and is guided by a level wind device C.

The spool shaft 2 has an engaging section (not shown), while the pinion 3 also has an engaging section (not shown). Those engaging sections are provided so that they freely engage with or disengage from each other, and operate with the clutch board 17 and the clutch operating member 5 of the clutch mechanism B and with the finger-placing member 6.

The clutch board 17 has both end portions which are mounted on supports 18 and 18 which are fixed outside the right side frame 1. The clutch board 17 is urged by a spring (not shown) so that the engaging section (not shown) of the spool shaft 2 and the engaging section (not shown) of the pinion 3 engage with each other.

A cylinder 1a is formed outside the right side frame 1, and the clutch operating member 5 which is cylindrical is swingably mounted on the cylinder 1a.

The finger-placing member 6 is provided between the right and left side frames 1 and 1' and behind a spool 13 in such a manner that it can be pushed downwardly.

A reverse-rotation preventing ratchet wheel 19 is mounted on the handle shaft 4 in a non-rotating posture, and a drive gear 14 is frictionally fitted on the handle shaft 4.

A plurality of kick protrusions 20 are fixedly provided on the outer periphery of the reverse-rotation preventing ratchet wheel 19.

Outside the reverse-rotation preventing ratchet wheel 19, a reverse-rotation preventing pawl 22 held between leaf springs 21 and 21 is swingably supported on a shaft 23. The leaf springs 21 and 21 hold both side surfaces of the reverse-rotation preventing ratchet wheel 19, and the end of the reverse-rotation preventing pawl 22 is freely engageable with the locking teeth which are formed in the outer periphery of the reverse-rotation preventing ratchet wheel 19.

Braking boards (not shown) and frictional boards (not shown) are accommodated inside the drive gear 14, thus forming a drag mechanism. The braking force of the drag mechanism is controlled with a drag adjusting knob 24.

The clutch operating member 5 comprises: an annular member 5a; a clutch lever 5b; a pair of clutch cams 5c formed on the end face of the annular member 5a; a clutch switching pin 25 embedded in the end face of the annular member 5a; and a spring connecting part 5d formed on the outer cylindrical surface of the annular member 5a.

The annular member 5a of the clutch operating member 5 is swingably mounted on the outer cylindrical surface of the cylinder 1a of the right side frame 1.

The clutching operating member 5 is urged by a dead point spring 26 which is hooked onto the spring connecting part 5d and the right side frame 1 so that it is placed selectively in a clutch "on" state or a clutch "off" state.

Pins 27 and 28 are embedded in the right side frame 1 to regulate the range of swing of the clutch lever 5b.

The clutch lever 5b is integral with the finger-placing member 6, or the former 5b and the latter 6 are formed separately and combined together with a screw 29.

Both end portions of the finger-placing member 6 are inserted into an arcuate through-hole 1b formed in the right side frame 1 and an arcuate through-hole 1c formed in the left side frame 1', respectively, in such a manner that the right end portion protrudes inside the right side board 10.

The kick lever 7 is swingably mounted on a shaft 30 secured to the right side frame 1.

One end portion 7a of the kick lever 7 extends in the region of swing of the kick protrusions 20 of the reverse-rotation preventing ratchet wheel 19, and the other end portion 7b extends so that it abuts against the clutch switching pin 25 on the end face of the annular member 5a.

The level wind device C comprises: a guide cylinder 31; a traverse cam 32 supported by a bearing (not shown) in the guide cylinder 31; and a fishing line guide 8 which slides on the guide cylinder 31 to the right and left.

One end portion of the traverse cam 32 protrudes from the right side frame 1 towards the right side board 10. A gear 33 is fixedly mounted on the one end portion, and engaged with the drive gear 14.

The fishing line guide 8 comprises: a guide body 8a which is fitted on a guide cylinder 31; a through-hole 8b formed in the guide body 8a into which the guide cylinder 31 is inserted; a protrusion 8c extending backwardly from the guide body 8a; a protrusion 8d extending downwardly from the guide body 8a; a through-hole 8e formed in the protrusion 8d into which an engaging piece 34 is inserted; a threaded portion 8f formed in the outer cylindrical surface of the protrusion 8d which is threadably engaged with a cap 35; a fishing-line guide 8g which is extending upwardly from the protrusion 8c; and a recess 8h formed in the rear surface of the protrusion 8c.

The fishing-line guide 8g has a through-hole into which a hard fishing-line guide member 36 is fixedly inserted.

A guide rod 37 is fitted in a through-hole 8i formed in the protrusion 8c that extends backwardly.

The engaging piece 34 is engaged with the traverse groove of the traverse cam shaft 32.

A cover member 9 whose front and rear portions are curved is arranged radially outwardly of the spool 13 between the right and left side frames 1 and 1' of the aforementioned side boards 10 and 11 except for at an upper opening which extends from the finger-placing member 6 to the fishing-line guide 8.

The front portion of the cover member 9 is located near the recess 8h of the fishing-line guide 8.

The surface of the cover member 9 is smooth, since it is made of fluoro-material or the like.

The double-bearing type fishing reel designed as described above operates as follows:

When the handle 15 is turned in a fishing-line take-up direction when the clutch is in the "on" state with the engaging section (not shown) of the spool shaft 2 engaged with the engaging section (not shown) of the pinion 3, the spool 13 is turned with the aid of the handle shaft 4, the drive gear 14, the pinion 3 and the spool shaft 2, while the fishing-line guide 8 of the level winding device C is reciprocated right and left in association with the rotation of the spool 13, so that the fishing line is wound evenly on the spool 13.

When the fishing line is pulled out by the movement of the catch (fish), the reverse-rotation preventing pawl 22 is locked to the reverse-rotation preventing ratchet wheel 19, so that the spool 13 is turned against the braking force of the drag mechanism which has been set with the drag adjusting knob 24.

Next, when the finger-placing member 6 is pressed downwardly with the finger, the finger-placing member 6 and the clutch lever 5b of the clutch operating member 5 swings downwardly.

When the clutch lever 5b is swung downwardly, the clutch board 17 is pushed upwardly by the pair of clutch cams 5c and 5c, whereby the engaging section (not shown) of the spool shaft 2 of the clutch mechanism B on the handle side is disengaged from the engaging section (not shown), so that the clutch is placed in the "off" state; that is, the spool becomes free.

When the hook, the float, etc. together with the fishing line are thrown under the condition that the spool is free, the fishing line is let out of the spool 13.

When the fishing line is let out in the above-described manner, the thumb of the hand holding the reel is placed on the outer surface of the windings of fishing line wound on the spool 13 while also being placed on the finger-placing member 6; that is, a thumbing operation is carried out.

When the hook, the float, etc. (not shown) together with the fishing line are thrown, the fishing line 16 may be detained between the spool 13 and the fishing line guide 8. However, since the cover member 9, whose front and rear portions is curved and whose surface are smooth, is provided between the finger-placing member 6 and the fishing line guide 8 and is provided radially outwardly of the spool 13, the difficulty is eliminated whereby the fishing line becomes twined around the protrusion or protrusions and is perhaps damaged as a result. In addition, the line throwing resistance due to the contact of the fishing line is reduced, and therefore the line throwing distance is greatly increased. Even if the fishing line is brought into contact with the cover member 9, it is not damaged at all. That is, the fishing line is increased in service life and the line throwing operation can be carried out smoothly.

When the handle 15 is turned with the finger-placing member 6 pushed downwardly, the reverse-rotation preventing ratchet wheel 19 turns clockwise in FIG. 2, so that the kick protrusion 20 is abutted against the one end portion 7a of the kick lever 7, whereby the kick lever 7 turns counterclockwise in FIG. 2.

When the kick lever 7 turns in the above-described manner, the other end portion of the kick lever 7 is abutted against the clutch switching pin 25 which is embedded in the end face of the annular member 5a of the clutch operating member, so that the annular member 5a is turned.

As the annular member 5a turns in the above-described manner, the pair of clutch cams 5c come out of the position of the clutch board 17, so that the pinion 3 is moved, and the engaging section (not shown) of the spool shaft 2 is engaged with the engaging section (not shown) of the pinion 3; that is, the clutch is placed in the "on" state, so that the spool 13 can be turned with the handle.

The double-bearing type fishing reel of the invention is designed as described above. Hence, when the hook, the float, etc. and the fishing line 16 are thrown under the condition that the spool is free with the clutch in the "off" state, the fishing line 16 is let out of the spool 13. In this case, the fishing line 16 may be detained between the spool 13 and the fishing line guide 8; however, since the cover member 9 having the curved front and rear end portions and the smooth surface is provided between the finger-placing member 6 and the fishing line guide 8 and radially outwardly of the spool 13, the occurrence of problems is prevented, whereby the fishing line becomes twined around the protrusion or protrusions and at worst it may be damaged. In addition, the line throwing resistance due to the contact of the fishing line is reduced, and therefore the line throwing distance is greatly increased. Even if the fishing line is brought into contact with the cover member 9, it is not damaged at all. That is, the fishing line is increased in service life. And the throwing operation is markedly improved in operability.

FIGS. 4 and 5 shows a second embodiment of the invention. More specifically, FIG. 4 is a plan view of another example of the double-bearing type fishing reel, which constitutes the second embodiment of the invention, and FIG. 5 is a side view, with parts cut away, showing essential components inside the side frame in the fishing reel shown in FIG. 4.

The right and left side frames 1 and 1' of the reel body A comprises: a finger-placing board 1*d* provided at the upper middle of the reel body A; the fixing board 1*e* of a reel leg 12; and a finger-placing member 6'. Those side frames 1 and 1' are arranged in parallel with each other. They are formed as one unit, or they are formed separately, and combined together as one unit.

In the second embodiment, the engaging section (not shown) of the spool shaft 2, and the engaging section (not shown) of the pinion 3 are operated with a clutch lever 38 which is provided on the side of the right side frame 1; that is, with the clutch lever 38, the clutch "on" state or the clutch "off" state is selectively obtained.

A cover member 9 whose front and rear portions are curved is arranged radially outwardly of the spool 13 between the right and left side frames 1 and 1' of the aforementioned side boards 10 and 11 except at a location of an upper opening extending from the finger-placing member 6 to the fishing-line guide 8.

The front portion of the cover member 9 is provided near the recess 8*h* of the fishing-line guide 8.

The surface of the cover member 9 is smooth, being made of fluoro-material.

The other arrangements of the second embodiment are analogous to those of the above-described first embodiment.

The functions of the second embodiment are analogous to those of the first embodiment except that the clutch mechanism cannot be operated with the finger-placing member 6'.

In the above-described embodiments, the clutch operating member 5 comprises: the annular member 5*a*, the clutch lever 5*b*, the pair of clutch cams 5*c* formed on the end face of the annular member 5*a*; the clutch switching pin 25 embedded in the end face of the annular member 5*a*; and the spring connecting part 5*d* formed on the outer cylindrical surface of the annular member 5*a*; however, the invention is not limited thereto or thereby; that is, it may be changed or modified without departing from the spirit of the invention.

The above-described embodiments are right-handle fishing reels; however, the invention is not limited thereto or thereby; that is, the technical concept of the invention may be equally applied to left-handle fishing reels.

Furthermore, in the above-described embodiments, the spool 13 is rotated by the rotation of the handle 15; however, the technical concept of the invention may be applied to a motor-driven fishing reel.

The double-bearing type fishing reel designed as described above has the following effects or merits.

When the fishing line is let out of the spool, it may be detained between the spool and the fishing line guide. However, the cover member 9, whose front and rear portions are smooth prevents the occurrence of the problem whereby the fishing line becomes twined around the protrusion or protrusions and at worst it may be damaged. In addition, the line throwing resistance due to the contact of the fishing line is reduced, and the line throwing distance is markedly increased. Even if the fishing line is brought into contact with the cover member, it is not damaged at all. That is, the fishing line is increased in service life and the line throwing operation is achieved smoothly.

What is claimed is:

1. A double-bearing type fishing reel comprising:
   a reel body with left and right side boards;
   a spool rotatably supported between said right and left side boards;
   a finger-placing member provided behind said spool;
   a level wind device comprising a fishing-line guide adapted to wind a fishing-line evenly on said spool; and
   a curved cover member having a smooth surface disposed between said right and left side boards and circumscribing at least a portion of said spool except in an upper opening that extends from said finger-placing member to said fishing-line guide.

2. A double-bearing type fishing reel according to claim 1, wherein said cover member extends from said finger-placing member to said fishing-line guide on a lower side of said reel body that extends from said finger-placing member to said fishing-line guide and is diametrically opposite from the upper opening with respect to an axis of said spool.

3. A double-bearing type fishing reel according to claim 1, wherein said cover member is arcurate in section taken along a plane orthogonal to an axis of said spool and extends from said finger-placing member to said fishing-line guide.

4. A double-bearing type fishing reel according to claim 1, wherein said cover member is made of fluoro-material.

5. A double-bearing type fishing reel according to claim 1, wherein said cover member is fixed relative to said reel body, including both said left and right side boards.

6. A double-bearing type fishing reel according to claim 1, wherein said cover member spans a distance between said left and right side boards along a length of said cover member.

7. A double-bearing type fishing reel according to claim 6, wherein said cover member is fixed relative to at least one of said left and right side boards.

8. A double-bearing type fishing reel comprising:
   a reel body with left and right side boards;
   a spool rotatably supported between said right and left side boards;
   a finger-placing member provided behind said spool;

a level wind device comprising a fishing-line guide adapted to wind a fishing-line evenly on said spool; and a cover member having a smooth surface extending in an arc from a position adjacent to said finger-placing member to a position adjacent to said level wind device, said cover member being disposed between said right and left side boards, wherein said arc is concave with respect to an axis of rotation of said spool, and wherein said arc is disposed between said spool and a fixing board of a reel leg.

9. A double-bearing type fishing reel according to claim 8, wherein said cover member extends from said finger-placing member to said fishing-line guide.

10. A double-bearing type fishing reel according to claim 8, wherein said cover member is made of fluoro-material.

11. A double-bearing type fishing reel according to claim 8, wherein said cover member is fixed relative to said reel body, including both said left and right side boards.

12. A double-bearing type fishing reel comprising:

a reel body with left and right side boards;

a spool rotatably supported between said right and left side boards;

a finger-placing member provided behind said spool;

a level wind device comprising a fishing-line guide adapted to wind a fishing-line evenly on said spool; and a cover member having a surface with no protuberances extending in an arc across only a lower portion of said reel body, said cover member being disposed between said right and left side boards.

13. A double-bearing type fishing reel according to claim 12, wherein said cover member extends from said finger-placing member to said fishing-line guide.

14. A double-bearing type fishing reel according to claim 12, wherein said cover member is made of fluoro-material.

15. A double-bearing type fishing reel according to claim 12, wherein said cover member is fixed relative to at least one of said left and right side boards.

16. A double-bearing type fishing reel according to claim 12, wherein said finger-placing member including an arcuate through-hole formed in at least one of said left and right side boards.

17. A double-bearing type fishing reel according to claim 16, wherein said cover member extends in an arc from a position adjacent to said arcuate through-hole to a position adjacent to said fishing line guide.

* * * * *